(12) United States Patent
Anderson (10) Patent No.: US 9,965,893 B2
(45) Date of Patent: May 8, 2018

(54) CURVATURE-DRIVEN NORMAL INTERPOLATION FOR SHADING APPLICATIONS

(71) Applicant: Google Inc., Mountain View, CA (US)

(72) Inventor: John Carl Anderson, Santa Clara, CA (US)

(73) Assignee: Google LLC., Mountain View, CA (US)

( * ) Notice: Subject to any disclaimer, the term of this patent is extended or adjusted under 35 U.S.C. 154(b) by 406 days.

(21) Appl. No.: 13/926,406

(22) Filed: Jun. 25, 2013

(65) Prior Publication Data

US 2016/0049001 A1   Feb. 18, 2016

(51) Int. Cl.
*G06T 15/00* (2011.01)
*G06T 17/05* (2011.01)
*G06T 15/80* (2011.01)

(52) U.S. Cl.
CPC ............. *G06T 17/05* (2013.01); *G06T 15/80* (2013.01)

(58) Field of Classification Search
CPC .. G06K 9/469; G06K 9/00275; G06K 9/4609; G06K 9/00281; G06T 17/05; G06T 15/80
See application file for complete search history.

(56) References Cited

U.S. PATENT DOCUMENTS

| | | | | |
|---|---|---|---|---|
| 5,142,617 A | * | 8/1992 | Dalrymple | G06T 15/87 345/441 |
| 5,253,339 A | * | 10/1993 | Wells | G06T 15/83 345/426 |
| 5,506,947 A | * | 4/1996 | Taubin | G06T 17/20 345/420 |
| 5,636,338 A | * | 6/1997 | Moreton | G06T 17/30 345/420 |
| 5,689,577 A | * | 11/1997 | Arata | G06T 17/20 345/423 |
| 5,929,860 A | * | 7/1999 | Hoppe | 345/419 |

(Continued)

OTHER PUBLICATIONS

Wikipedia contributors, "Phong shading", Wikipedia, The Free Encyclopedia, May 27, 2013. Web. Jun. 25, 2013—3 pages.

(Continued)

*Primary Examiner* — Devona Faulk
*Assistant Examiner* — Charles L Beard
(74) *Attorney, Agent, or Firm* — Dority & Manning, P.A.

(57) ABSTRACT

Systems and methods for performing shading operations of a three-dimensional model, such as a three-dimensional model of a geographic area, are provided. According to aspects of the present disclosure, shading operations can be performed based on a curvature of the polygon mesh such that smooth surfaces still appear smooth after shading and such that sharp edges still appear sharp after shading. In particular, a curvature-driven normal is used for shading operations that takes into account the local curvature of the polygon mesh. A curvature factor can be obtained for each vertex in the polygon mesh. The curvature factor for each vertex can be a scalar value that describes the degree of local curvature in the mesh polygons connected at the vertex. The curvature-driven normal for each fragment can be determined based on the curvature factors associated with the vertices in the polygon mesh.

16 Claims, 6 Drawing Sheets

(56) References Cited

U.S. PATENT DOCUMENTS

| | | | | |
|---|---|---|---|---|
| 6,061,065 | A * | 5/2000 | Nagasawa | G06T 17/20 345/427 |
| 6,078,333 | A * | 6/2000 | Wittig et al. | 345/426 |
| 6,175,367 | B1 * | 1/2001 | Parikh | G06T 15/506 345/426 |
| 6,268,860 | B1 * | 7/2001 | Bonello | 345/426 |
| 6,400,365 | B1 * | 6/2002 | Setoguchi | G06T 15/06 345/427 |
| 6,407,744 | B1 * | 6/2002 | Van Overveld | G06T 15/50 345/582 |
| 6,429,872 | B1 * | 8/2002 | Ernst | 345/584 |
| 6,504,538 | B1 * | 1/2003 | Freund | G06T 15/50 345/426 |
| 6,614,431 | B1 * | 9/2003 | Collodi | 345/426 |
| 6,690,369 | B1 * | 2/2004 | Smith, Jr. | G06T 15/10 345/419 |
| 6,697,066 | B2 * | 2/2004 | Stuttard | G06T 15/80 345/423 |
| 6,724,383 | B1 * | 4/2004 | Herken | G06T 15/80 345/420 |
| 6,738,062 | B1 * | 5/2004 | Moreton | G06T 17/20 345/420 |
| 6,744,442 | B1 * | 6/2004 | Chan et al. | 345/587 |
| 6,765,573 | B2 * | 7/2004 | Kouadio | G06T 15/04 345/426 |
| 6,819,319 | B1 * | 11/2004 | Fenney | 345/426 |
| 6,879,324 | B1 * | 4/2005 | Hoppe | G06T 17/20 345/419 |
| 6,987,511 | B2 * | 1/2006 | Taubin | G06T 17/20 345/420 |
| 7,034,827 | B2 * | 4/2006 | Hurley et al. | 345/426 |
| 7,098,925 | B1 * | 8/2006 | Lake | G06T 15/02 345/426 |
| 7,397,474 | B2 * | 7/2008 | Couture-Gagnon | G06T 17/30 345/420 |
| 7,580,036 | B2 * | 8/2009 | Montagnese | G06T 3/0018 345/427 |
| 7,782,322 | B2 * | 8/2010 | Setoguchi | G06T 17/00 345/420 |
| 7,808,503 | B2 * | 10/2010 | Duluk, Jr. | G06T 1/60 345/419 |
| 7,812,839 | B2 * | 10/2010 | Chu | G01B 11/24 345/419 |
| 7,940,262 | B2 * | 5/2011 | Konev | G06T 15/40 345/419 |
| 8,031,193 | B1 * | 10/2011 | Henderson | G06T 17/05 345/426 |
| 8,319,786 | B2 * | 11/2012 | Endo | A63F 13/10 345/426 |
| 8,477,147 | B2 * | 7/2013 | Livingston et al. | 345/581 |
| 8,515,982 | B1 * | 8/2013 | Hickman et al. | 707/758 |
| 8,633,970 | B1 * | 1/2014 | Mercay et al. | 348/46 |
| 8,660,376 | B2 * | 2/2014 | Ahn | G06T 9/001 382/238 |
| 8,665,266 | B2 * | 3/2014 | Vandrovec | G06T 17/005 345/420 |
| 8,805,088 | B1 * | 8/2014 | Mesolongitis | G06T 17/10 348/135 |
| 8,965,069 | B2 * | 2/2015 | Inanc | G06K 9/036 382/125 |
| 9,082,218 | B2 * | 7/2015 | Ignatoff | G06T 19/00 |
| 9,147,288 | B1 * | 9/2015 | Johnston | G06T 19/00 |
| 9,153,065 | B2 * | 10/2015 | Collins | G06T 15/60 |
| 9,251,618 | B2 * | 2/2016 | Kautzman | G06T 13/40 |
| 9,489,770 | B2 * | 11/2016 | Iwamoto | G06T 17/10 |
| 9,589,083 | B2 * | 3/2017 | Vold | G06F 17/13 |
| 9,792,728 | B2 * | 10/2017 | Luo | G06T 17/20 |
| 2002/0005856 | A1 * | 1/2002 | Sasaki | G06T 17/20 345/606 |
| 2002/0033821 | A1 * | 3/2002 | Sfarti | 345/423 |
| 2002/0080136 | A1 * | 6/2002 | Kouadio | G06T 15/04 345/426 |
| 2002/0118212 | A1 * | 8/2002 | Lake | G06T 15/02 345/606 |
| 2002/0149580 | A1 * | 10/2002 | Perry et al. | 345/419 |
| 2003/0011595 | A1 * | 1/2003 | Goel | G06T 17/20 345/423 |
| 2003/0016217 | A1 * | 1/2003 | Vlachos | G06T 17/20 345/423 |
| 2003/0137511 | A1 * | 7/2003 | Aruga | G06T 15/55 345/426 |
| 2004/0021662 | A1 * | 2/2004 | Taubin | G06T 9/00 345/419 |
| 2004/0075655 | A1 * | 4/2004 | Dunnett | G06T 17/20 345/418 |
| 2004/0075659 | A1 * | 4/2004 | Taubin | G06T 17/20 345/428 |
| 2004/0090437 | A1 * | 5/2004 | Uesaki | G06T 17/30 345/420 |
| 2004/0113909 | A1 * | 6/2004 | Fenney | G06T 17/30 345/419 |
| 2004/0169652 | A1 * | 9/2004 | Herken | G06T 15/80 345/426 |
| 2004/0170302 | A1 * | 9/2004 | Museth et al. | 382/107 |
| 2004/0252870 | A1 * | 12/2004 | Reeves | G06T 7/0012 382/128 |
| 2005/0019732 | A1 * | 1/2005 | Kaufmann | A61C 7/00 433/213 |
| 2005/0052452 | A1 * | 3/2005 | Baumberg | G06T 7/0067 345/419 |
| 2005/0093857 | A1 * | 5/2005 | Wang et al. | 345/419 |
| 2005/0093862 | A1 * | 5/2005 | Boier-Martin et al. | 345/420 |
| 2005/0168460 | A1 * | 8/2005 | Razdan et al. | 345/419 |
| 2005/0184997 | A1 * | 8/2005 | Lake | G06T 15/02 345/582 |
| 2005/0243089 | A1 * | 11/2005 | Johnston | G06T 15/50 345/426 |
| 2006/0056695 | A1 * | 3/2006 | Wu | G06T 1/0028 382/173 |
| 2006/0139348 | A1 * | 6/2006 | Harada | G06T 17/20 345/420 |
| 2006/0176302 | A1 * | 8/2006 | Hayes | G06T 15/06 345/426 |
| 2006/0235666 | A1 * | 10/2006 | Assa et al. | 703/10 |
| 2006/0274070 | A1 * | 12/2006 | Herman et al. | 345/474 |
| 2007/0132776 | A1 * | 6/2007 | Kim et al. | 345/582 |
| 2007/0188490 | A1 * | 8/2007 | Kanai et al. | 345/423 |
| 2007/0247458 | A1 * | 10/2007 | Surazhsky | G06T 17/20 345/423 |
| 2007/0251161 | A1 * | 11/2007 | Tuczek | E04B 7/102 52/80.1 |
| 2007/0271079 | A1 * | 11/2007 | Oguchi et al. | 703/8 |
| 2007/0291029 | A1 * | 12/2007 | Konev | G06T 15/40 345/421 |
| 2008/0012853 | A1 * | 1/2008 | Geiger | G06T 17/20 345/420 |
| 2008/0018647 | A1 * | 1/2008 | Bunnell | G06T 13/00 345/426 |
| 2008/0062167 | A1 * | 3/2008 | Boggs et al. | 345/419 |
| 2008/0079722 | A1 * | 4/2008 | Burns et al. | 345/424 |
| 2008/0122836 | A1 * | 5/2008 | Van Horn | G06T 15/04 345/419 |
| 2008/0129727 | A1 * | 6/2008 | Oh et al. | 345/419 |
| 2008/0205717 | A1 * | 8/2008 | Reeves | G06T 7/0012 382/128 |
| 2008/0205749 | A1 * | 8/2008 | Sundaram | G06K 9/00201 382/154 |
| 2008/0215174 | A1 * | 9/2008 | Kanai | G06F 17/50 700/98 |
| 2008/0218517 | A1 * | 9/2008 | Holmdahl | G06T 15/506 345/426 |
| 2008/0221843 | A1 * | 9/2008 | Shenkar et al. | 703/1 |
| 2009/0074268 | A1 * | 3/2009 | Tanaka | G06T 7/0012 382/128 |
| 2009/0146995 | A1 * | 6/2009 | Van Bael et al. | 345/419 |
| 2009/0153578 | A1 * | 6/2009 | Kim | G06T 15/02 345/582 |

(56) References Cited

U.S. PATENT DOCUMENTS

| | | | |
|---|---|---|---|
| 2009/0187388 A1* | 7/2009 | Shu | G06K 9/00214 703/2 |
| 2009/0213119 A1* | 8/2009 | Oh | G06T 17/20 345/423 |
| 2009/0244082 A1* | 10/2009 | Livingston | G06K 9/00275 345/581 |
| 2009/0244480 A1* | 10/2009 | De Gaudemaris | G02C 7/02 351/159.41 |
| 2009/0289940 A1* | 11/2009 | Kimura | G06T 15/80 345/426 |
| 2009/0303235 A1* | 12/2009 | Maekawa et al. | 345/423 |
| 2009/0322749 A1* | 12/2009 | Kassab | G06T 7/0012 345/424 |
| 2010/0020079 A1* | 1/2010 | Endo | A63F 13/10 345/426 |
| 2010/0114350 A1* | 5/2010 | Kanai | G05B 19/4097 700/98 |
| 2010/0220099 A1* | 9/2010 | Maekawa | G06F 17/50 345/419 |
| 2011/0109719 A1* | 5/2011 | Wilson et al. | 348/42 |
| 2011/0242285 A1* | 10/2011 | Byren | G01B 11/24 348/47 |
| 2012/0013616 A1* | 1/2012 | Uesaki | H04N 13/0275 345/419 |
| 2012/0046782 A1* | 2/2012 | Schulze | G05B 19/4093 700/187 |
| 2012/0194644 A1* | 8/2012 | Newcombe et al. | 348/46 |
| 2012/0230566 A1* | 9/2012 | Dean | G06T 19/00 382/131 |
| 2012/0262457 A1* | 10/2012 | Gautron | G06T 15/04 345/426 |
| 2012/0293550 A1* | 11/2012 | Lo et al. | 345/633 |
| 2012/0330447 A1* | 12/2012 | Gerlach | G01B 11/24 700/95 |
| 2012/0330636 A1* | 12/2012 | Albou | G06K 9/00201 703/12 |
| 2013/0002670 A1* | 1/2013 | Kikuta | G06T 15/04 345/420 |
| 2013/0024545 A1* | 1/2013 | Sheppard | A63F 13/12 709/217 |
| 2013/0124148 A1* | 5/2013 | Jin et al. | 703/1 |
| 2013/0124149 A1* | 5/2013 | Carr | G06F 17/50 703/1 |
| 2013/0127848 A1* | 5/2013 | Joshi et al. | 345/420 |
| 2013/0129170 A1* | 5/2013 | Zheng | G06T 7/0079 382/131 |
| 2013/0185027 A1* | 7/2013 | Lawitschka | A61C 13/0004 703/1 |
| 2013/0271488 A1* | 10/2013 | Stirbu et al. | 345/619 |
| 2014/0002455 A1* | 1/2014 | Senften | G06T 17/00 345/420 |
| 2014/0003695 A1* | 1/2014 | Dean et al. | 382/131 |
| 2014/0028673 A1* | 1/2014 | Gregson | G06T 17/20 345/420 |
| 2014/0093146 A1* | 4/2014 | Inanc | G06K 9/00073 382/125 |
| 2014/0176535 A1* | 6/2014 | Krig | G06T 15/04 345/419 |
| 2014/0218364 A1* | 8/2014 | Collins | G06T 15/60 345/426 |
| 2014/0278065 A1* | 9/2014 | Ren | 701/454 |
| 2014/0279860 A1* | 9/2014 | Pan | G06F 17/3087 707/609 |
| 2015/0206341 A1* | 7/2015 | Loper | G06T 17/10 345/420 |
| 2015/0279097 A1* | 10/2015 | Noma | G06T 11/206 345/420 |
| 2016/0148420 A1* | 5/2016 | Ha | G06T 15/50 345/426 |
| 2016/0236417 A1* | 8/2016 | Rothenberg | G05B 19/4099 |
| 2016/0261844 A1* | 9/2016 | Kadambi | G01B 11/00 |
| 2016/0330493 A1* | 11/2016 | Chuah | G06T 15/04 |
| 2017/0084068 A1* | 3/2017 | Son | G06K 9/00208 |
| 2017/0084075 A1* | 3/2017 | Robert | G06T 15/506 |
| 2017/0200301 A1* | 7/2017 | Boisse | A63F 13/525 |
| 2017/0236325 A1* | 8/2017 | Lecocq | G06T 15/005 345/426 |

OTHER PUBLICATIONS

Wikipedia contributors, "Shading", Wikipedia, The Free Encyclopedia, Apr. 22, 2013. Web. Jun. 25, 2013—6 pages.

* cited by examiner

CURVATURE-DRIVEN NORMAL INTERPOLATION FOR SHADING APPLICATIONS

FIELD

The present disclosure relates generally to computer rendering of three-dimensional models, and more particularly to the determination of normals for a three-dimensional model based on local curvature of the three-dimensional model.

BACKGROUND

Computer graphics applications can be used to render a three-dimensional model. For instance, an interactive geographic information system can be used to present an interactive three-dimensional model of a geographic area to a user in a suitable user interface, such as a browser. A user can navigate the three-dimensional model by controlling a virtual camera that specifies what portion of the three-dimensional model is rendered and presented to a user. The three-dimensional model can include a polygon mesh, such as a triangle mesh, used to model the geometry (e.g. terrain, buildings, and other objects) of the geographic area. Geographic imagery, such as aerial or satellite imagery, can be texture mapped to the polygon mesh so that the three-dimensional model provides a more accurate and realistic representation of the scene.

Shading operations can be performed on the three-dimensional model to adjust the appearance of the three-dimensional model, such as to add surface lighting for sunlight, shadows, and atmospheric effects. A shading operation applies light or color within a computer graphics pipeline to change the appearance of the graphical representation of the three-dimensional model. Shading operations are typically performed using normal information determined for the polygon mesh. The normals determine how much light or color is applied to each point on a surface of the polygon mesh.

Determining good normals for generating realistic shading effects can be difficult because the polygon mesh only provides an approximation of the true surface modeled by the polygon mesh. For example, using vertex normals for shading operations can result in smoothing of sharp features in the three-dimensional model (e.g. building edges) represented in the polygon mesh. Using face normals for shading operations can result in the three-dimensional model looking triangulated or faceted with discontinuities between the polygon faces, which can disrupt the appearance of smooth features (e.g. smooth terrain) in the three-dimensional model.

SUMMARY

Aspects and advantages of the invention will be set forth in part in the following description, or may be obvious from the description, or may be learned through practice of the invention.

One exemplary aspect of the present disclosure is directed to a computer-implemented method of rendering a three-dimensional model, such as a three-dimensional model of a geographic area. The method includes accessing, at a computing device, a polygon mesh representing geometry of the three-dimensional model. The polygon mesh includes a mesh polygon and a vertex. The method further includes obtaining, with the computing device, a curvature factor for the vertex of the polygon mesh. The curvature factor for the vertex is indicative of a local curvature of the polygon mesh at the vertex. The method further includes, obtaining, with the computing device, a curvature-driven normal for a fragment of the polygon mesh located on the mesh polygon. The curvature-driven normal is determined based at least in part on the curvature factor determined for the vertex. The method further includes performing a shading operation using the curvature-driven normal.

Other exemplary aspects of the present disclosure are directed to systems, apparatus, non-transitory computer-readable media, user interfaces and devices for generating and rendering a three-dimensional model.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which:

FIGS. 5($a$)-5($c$) depict the exemplary determination of a curvature factor for a vertex of a polygon mesh according to an exemplary embodiment of the present disclosure;

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Overview

Generally, the present disclosure relates to performing shading operations of a three-dimensional model, such as a three-dimensional model of a geographic area. The three-dimensional model can include a polygon mesh representing the geometry of the three-dimensional model, such as the geometry of terrain and buildings of a geographic area. The polygon mesh can include a plurality of mesh polygons (e.g. triangles) interconnected by edges and vertices. The polygon mesh can model sharp features (e.g. portions associated with building corners) as well as smooth features (e.g. smooth terrain). Shading operations can be used to apply light and/or color to the three-dimensional model to provide various effects, such as to add surface lighting for sunlight, shadows, etc. According to aspects of the present disclosure, shading operations can be performed based on a curvature of the mesh such that smooth surfaces still appear smooth after shading and such that sharp edges still appear sharp after shading.

Figure 1:
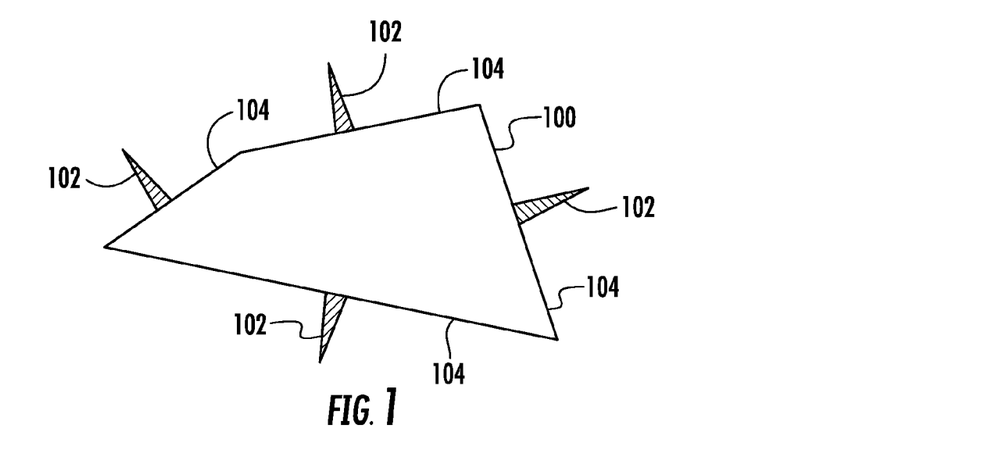
FIG. 1 depicts an exemplary polygon mesh and associated face normals.
Figure 2:
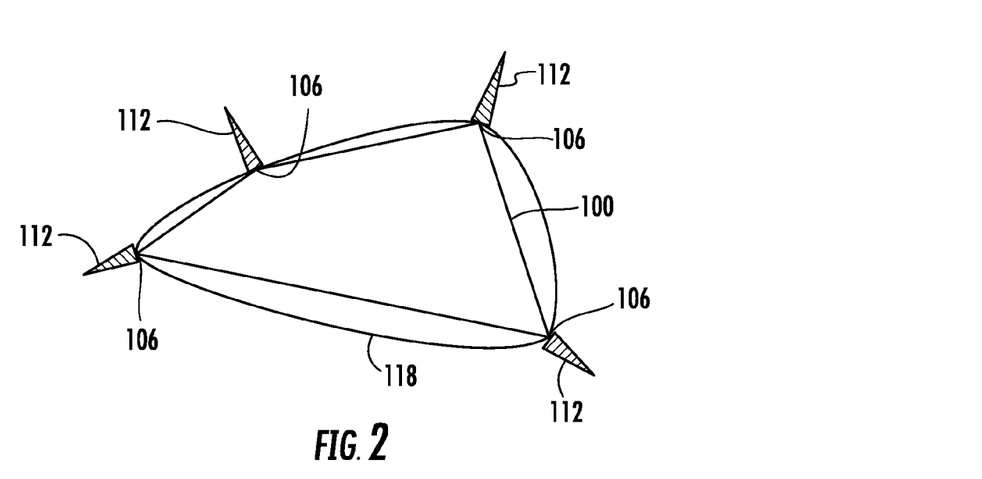
FIG. 2 depicts an exemplary polygon mesh and associated vertex normals.

Shading operations are typically performed using normals determined for the polygon mesh. The normals are used to determine how much light or color to apply to each portion of the polygon mesh. Exemplary normals include face normals and vertex normals. A polygon mesh with associated face normals is depicted in FIG. 1. A polygon mesh with associated surface normals is depicted in FIG. 2. FIGS. 1 and 2 depict two-dimensional representations of a polygon mesh for purposes illustration and discussion. One of ordinary skill in the art, using the disclosures provided herein, will recognize that two-dimensional representations set forth in any of the FIGS. disclosed herein can be representative of three-dimensional elements.

FIG. 1 depicts a representation of an exemplary polygon mesh 100 and its associated face normals 102. Face normals 102 are associated with each mesh polygon 104 in the polygon mesh 100. The face normals 102 are normalized vectors extending in a direction perpendicular to the surface of each mesh polygon 104. The face normals 102 are constant across the surface of each mesh polygon 104. Flat shading operations are typically performed using face normals. Flat shading using face normals can result in the three-dimensional model having a faceted look as a result of the discrete directions of the face normals. This faceted look can be appropriate for sharp features represented in the polygon mesh but can disrupt the appearance of smooth features represented in the polygon mesh.

FIG. 2 depicts a representation of the exemplary polygon mesh 100 and its associated vertex normals 112. The vertex normals 112 are associated with each vertex 106 in the polygon mesh 100. The vertex normals 106 are normalized vectors that can be determined as the normalized average of the face normals of the mesh polygons connected at the vertex. During shading operations, such as Phong shading, vertex normals 112 can be interpolated across the surfaces of the mesh polygons 104. Curve 118 represents the smooth appearance of the polygon mesh resulting from interpolation of the vertex normals 112 across the surfaces of the mesh polygons 104 in the polygon mesh 100. While shading using vertex normals can be suitable for smooth features represented in the polygon mesh, it can negatively affect the appearance of sharp features.

According to aspects of the present disclosure, a curvature-driven normal is used for shading operations. The curvature-driven normal is a normal that can be used for shading operations that takes into account the local curvature of the polygon mesh. More particularly, a curvature factor can be obtained for each vertex in the polygon mesh. The curvature factor for each vertex can be a scalar value that describes the degree of local curvature of the mesh polygons connected at the vertex. For instance, in a particular embodiment, the curvature factor can be calculated based at least in part on the dot product of the face normals associated with the mesh polygons connected at the vertex.

The curvature factor can range from 0 to 1 mapping from a set of locally planar mesh polygons to mesh polygons that meet perpendicularly or at sharper angles. In relatively flat areas of the three-dimensional model (i.e. portions of the model representing rolling hills, roads, etc.), the mesh polygons will have similar spatial orientation. For such a vertex, the curvature factor will be near 0. For a vertex in the model representing the corner of a building, however, the mesh polygons can meet at 90° or sharper angles. In this case, the curvature factor can be near 1.

A curvature-driven normal can be computed for each fragment in the mesh. A fragment of the polygon mesh is a discrete portion or point of the polygon mesh. The curvature-driven normal for each fragment can be determined based on the curvature factors associated with the vertices in the mesh. In particular, the curvature factors can be interpolated across the surfaces of the mesh polygons to identify curvature factors for each fragment in the mesh.

In a particular implementation, a face normal, an interpolated vertex normal, and an interpolated curvature factor can be determined for each fragment. The curvature-driven normal can then be determined for the fragment based on the face normal, the interpolated vertex normal, and the interpolated curvature factor for the fragment. The curvature-driven normal for a fragment can assign more weight to the interpolated vertex normal for the fragment when the curvature factor for the fragment is near 0. The curvature-driven normal for the fragment can assign more weight to the face normal for the fragment when the curvature factor for the fragment is near 1.

A shading operation can be performed using the curvature-driven normals determined based on the curvature factors. The result is that sharp features (e.g. features associated with a high curvature factor) get better lighting because the shading will tend more toward face normal. Smooth features (e.g. features associated with a low curvature factor) will not look faceted because they tend more toward vertex normal.

Figure 3:
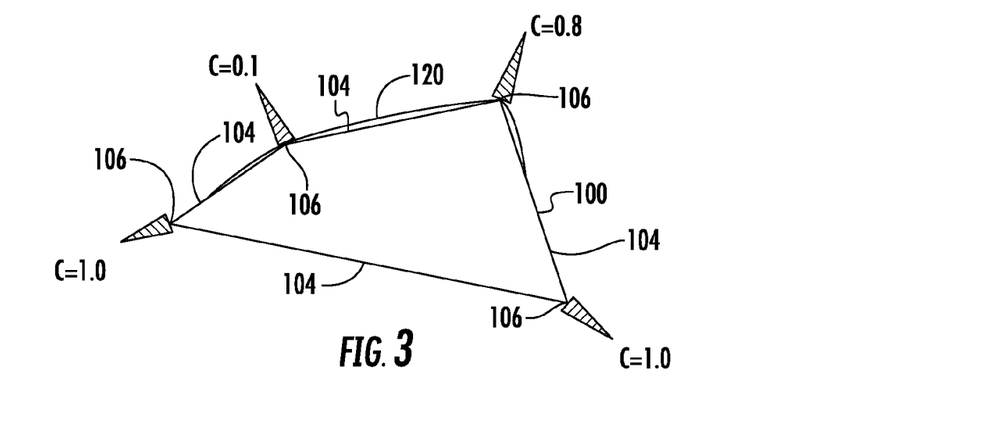
FIG. 3 depicts an exemplary polygon mesh and associated curvature factors according to an exemplary embodiment of the present disclosure.

FIG. 3 depicts a representation of the exemplary polygon mesh 100 and its associated curvature factors at each vertex 106. During shading operations, the curvature factors can be interpolated across the surfaces of the mesh polygons 104. Curve 120 represents the smoothing of the polygon mesh resulting from shading using curvature-driven normals determined from the curvature factors. As demonstrated, the surface shading of the polygon mesh 100 is smoothed only where the curvature factor is low. The use of curvature-driven normals can remove the faceted look of flat shading using face normals in areas of low curvature, while preserving sharp corners (e.g. building edges) represented in the polygon mesh.

Exemplary Method for Rendering a
Three-Dimensional Model

Figure 4:
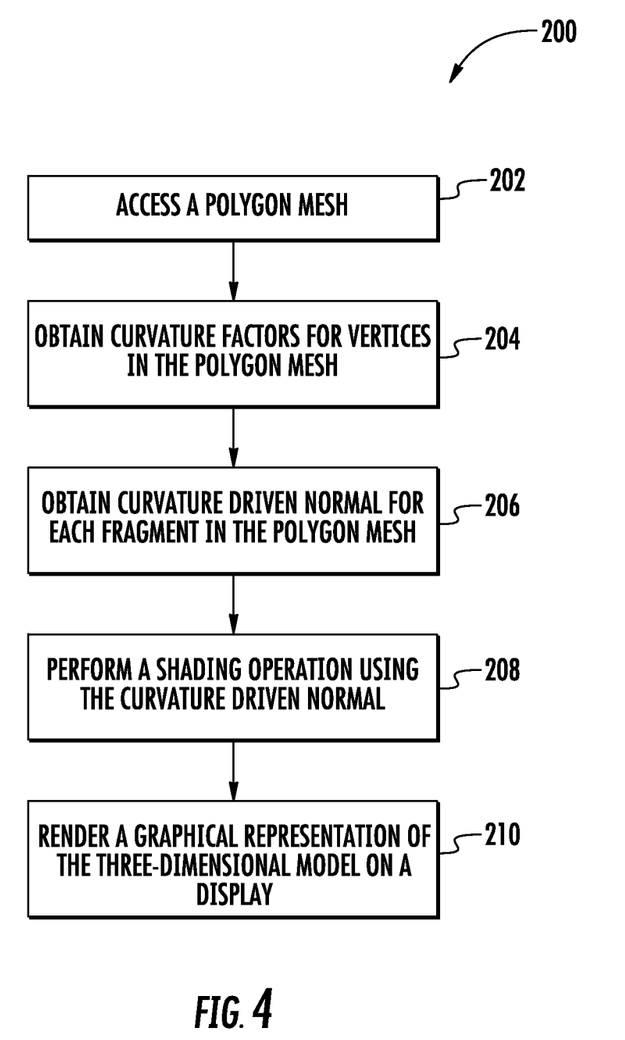
FIG. 4 depicts a flow diagram of an exemplary method for rendering a three-dimensional model according to an exemplary embodiment of the present disclosure.

FIG. 4 depicts an exemplary method (200) for rendering a three-dimensional model according to an exemplary embodiment of the present disclosure. The method (200) of FIG. 4 can be implemented using any suitable computing device, such as one of the client computing devices 630 depicted in FIG. 8. In addition, FIG. 4 depicts steps performed in a particular order for purposes of illustration and discussion. One of ordinary skill in the art, using the disclosures provided herein, will understand that the steps of any of the methods discussed herein can be omitted, adapted, rearranged, or expanded in various ways without deviating from the scope of the present disclosure.

At (202), a polygon mesh representing geometry of the three-dimensional model is accessed. For instance, a binary representation of the polygon mesh can be accessed from a local memory. If the polygon mesh or a portion of the polygon mesh is not available in a local memory, the polygon mesh can be accessed by fetching the polygon mesh from a remote computing device (e.g. a web server hosting a geographic information system) over a network, such as the Internet.

The polygon mesh includes a plurality of mesh polygons (e.g. triangles) interconnected by vertices and edges. Each mesh polygon includes a polygon face that represents a portion of a surface of the three-dimensional model. The polygon mesh can be represented in any suitable format, such as a depth map, height field, closed mesh, signed distance field, or any other suitable type of representation.

In the example where the three-dimensional model is of a geographic area, the polygon mesh can be a stereo reconstruction generated from aerial or satellite imagery of the geographic area. The imagery can be taken by overhead cameras, such as from aircraft, at various oblique or nadir perspectives. In the imagery, features can be detected and correlated with one another. The points can be used to determine a stereo mesh from the imagery. In this way, a three-dimensional model can be determined from two-dimensional imagery.

At (204), the method includes obtaining curvature factors for vertices in the polygon mesh. Obtaining the curvature factors can refer to accessing previously determined curvature factors stored in a memory or to determining/computing the curvature factors from the polygon mesh. In one implementation, the curvature factors can be encoded with the vertices in the polygon mesh. For instance, the curvature factors can be computed during generation of the polygon mesh. Each vertex can then be tagged with its curvature factor. The curvature factors for the vertices in the polygon mesh can be obtained when the polygon mesh is accessed for rendering.

The curvature factor associated with each vertex is indicative of the local curvature at each vertex. The curvature factor can be a single scalar value, for instance in the range from 0 to 1. A curvature factor close to 0 can be indicative of a set of planar mesh polygons connected at the vertex. A curvature close to 1 can be indicative of a set of perpendicular or sharper intersecting mesh polygons at the vertex.

In one exemplary implementation, the curvature factor for each vertex can be determined based on face normals associated with each mesh polygon connected at the vertex. The face normals can be determined for each mesh polygon using any suitable technique, such as known derivative functions implemented in an OpenGL shading language or other suitable graphics programming language, used to compute a constant face normal over each mesh polygon. The curvature factor can be determined for the vertex by computing the dot product of the face normals of the mesh polygons connected at the vertex. For instance, in a particular implementation, the curvature factor can be computed as follows:

$$C=1-D$$

where C is the curvature factor for the vertex and D is the dot product of the face normals of the mesh polygons connected at the vertex. The curvature factor for mesh polygons that intersect at angles sharper than 90° can be clamped to 1.

Figure 5A:
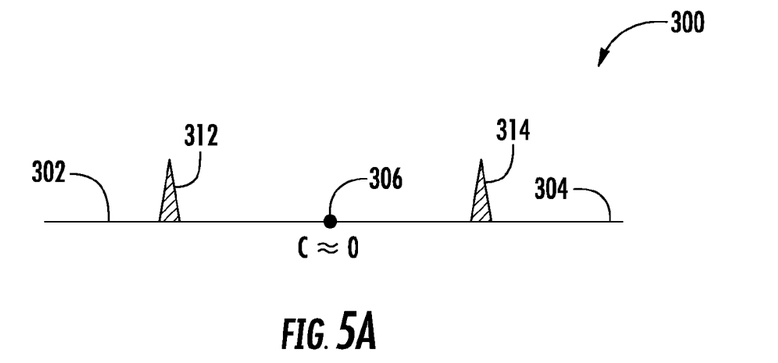
Figure 5B:
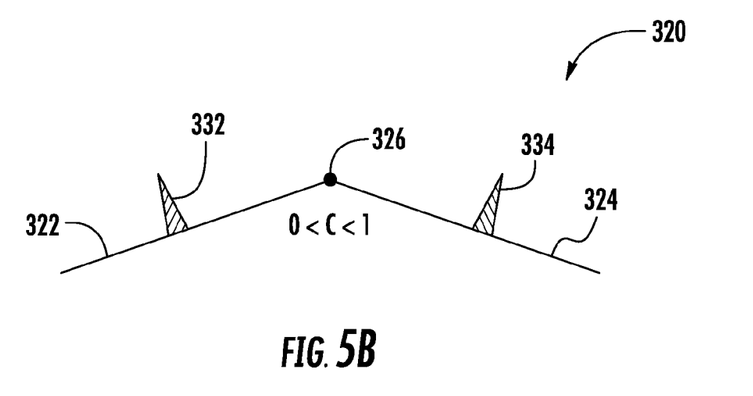
Figure 5C:
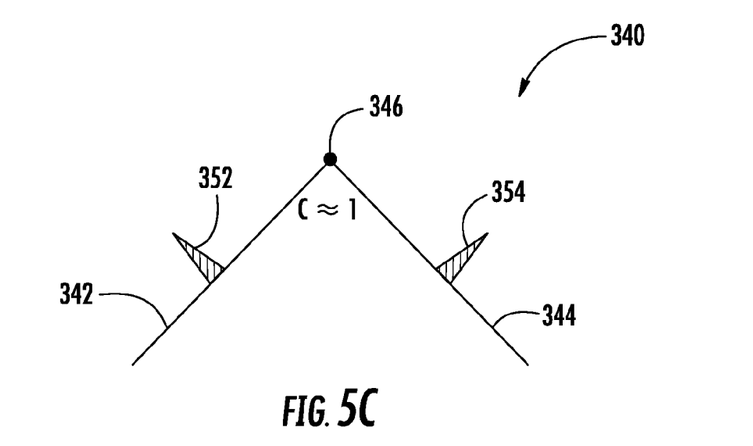

For instance, FIGS. 5(a)-5(c) depict the exemplary determination of a curvature factor for a vertex according to an exemplary embodiment of the present disclosure. FIG. 5(a) depicts a representation of a polygon mesh 300 having mesh polygons 302 and 304 connected at vertex 306. As depicted, the mesh polygons 302 and 304 are near planar with respect to one another. The mesh polygon 302 is associated with a face normal 312 and the mesh polygon 304 is associated with a face normal 314. The curvature factor C for the vertex 306 can be determined based on the dot product of the face normal 312 and the face normal 314 (e.g. by subtracting the dot product from 1). Because the face normal 312 and the face normal 314 are generally parallel, the curvature factor C for the vertex is determined to be about 0.

FIG. 5(b) depicts a representation of a polygon mesh 320 having mesh polygons 322 and 324 connected at vertex 326. The mesh polygon 322 is associated with a face normal 332. The mesh polygon 324 is associated with a face normal 334. The curvature factor C for the vertex 326 can be computed based on the dot product of the face normal 332 and the face normal 334 (e.g. by subtracting the dot product from 1). In this example, the curvature factor C for the vertex can be between 0 and 1 because the face normals 332 and 334 are not quite parallel but are not perpendicular (or greater) with respect to one another.

FIG. 5(c) depicts a representation of a polygon mesh 340 having mesh polygons 342 and 344 connected at vertex 346. The mesh polygon 342 is associated with a face normal 352. The mesh polygon 344 is associated with a face normal 354. The curvature factor for the vertex 326 can be computed based on the dot product of the face normal 352 and the face normal 354 (e.g. by subtracting the dot product from 1). In this example, the curvature factor C for the vertex can be about 1 because the face normals 352 and 354 are close to perpendicular to one another.

Referring back to FIG. 4 at (206), a curvature-driven normal is obtained for one or more fragments of the polygon mesh based on the curvature factors. Each fragment of the polygon mesh can represent a discrete portion of the polygon mesh. In one embodiment, each fragment in the polygon mesh can correspond to a pixel in the graphical representation of the three-dimensional model to be rendered on a display device.

The curvature-driven normal can be determined by interpolating the curvature factor of each vertex of the polygon face on which the fragment is located to obtain an interpolated curvature factor for the fragment. A face normal and an interpolated vertex normal can also be obtained for the fragment. The curvature-driven normal can be determined based on the interpolated curvature factor, the face normal, and the interpolated vertex normal. An exemplary method for determining the curvature-driven normal for each fragment based on the curvature factors will be discussed in detail below with reference to FIG. 6.

Referring to FIG. 4 at (208), a shading operation can be performed using the curvature-driven normals. The shading operation applies light or color to the surface of the three-dimensional model. The shading operation can use the curvature-driven normals to determine how much light to apply to each portion (e.g. fragment) of the three-dimensional model. For example, the shading operation can be a lighting operation that applies light to the three-dimensional model from one or more lights sources (e.g. the sun). The shading operation can adjust the lighting or color of the three-dimensional model based on the relationship between the position of the one or more light sources and the curvature-driven normals determined for the polygon mesh.

At (210), a graphical representation of the three-dimensional model can be rendered on the display of a computing device. A user can interact with the three-dimensional model, for instance, to view the three-dimensional model from different perspectives, using a suitable user interface. The user interface can provide tools to allow the user to zoom, pan, tilt, or otherwise navigate the three-dimensional model. In a particular implementation, the user interface can present tools to adjust the shading of the three-dimensional model. For instance, in the example of a geographic information system providing a three-dimensional model of a geographic area, the user can control the position of the sun or other light source with respect to the three-dimensional model. The light and shadows applied to the surfaces of the three-dimensional model can be adjusted using a shading operation depending on the location of the light source and the curvature-driven normals determined for the three-dimensional model.

Exemplary Method for Determining Surface Driven Normal for a Fragment

Figure 6:
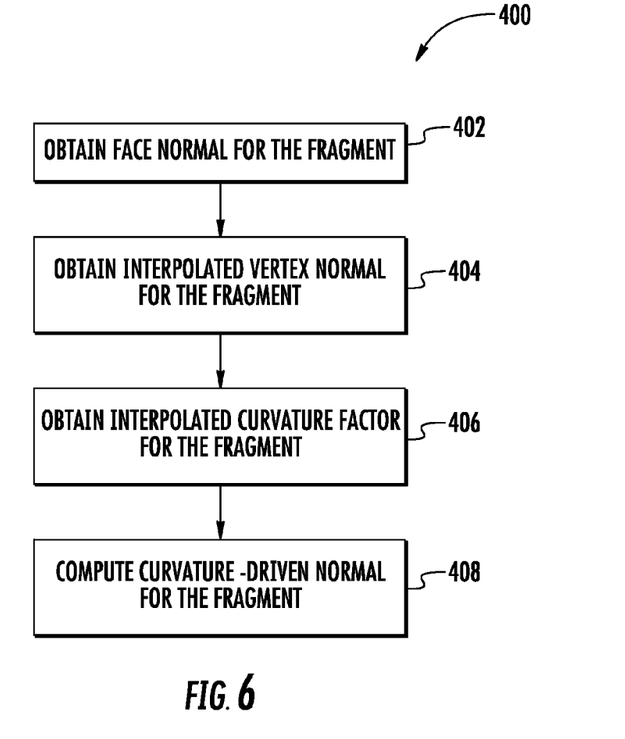
FIG. 6 depicts a flow diagram of an exemplary method for obtaining a curvature-driven normal for a fragment in the polygon mesh according to an exemplary embodiment of the present disclosure.

FIG. 6 depicts a flow diagram of an exemplary method (400) for obtaining curvature-driven normals for a fragment in the polygon mesh according to an exemplary embodiment of the present disclosure. The method (400) will be discussed with reference to a single fragment of the polygon mesh for purposes of illustration and discussion. Those of ordinary skill in the art, using the disclosures provided herein, should understand that the method (400) can be performed for each fragment of the polygon mesh.

At (402), the method includes obtaining a face normal for the fragment. For instance, a graphics shader module can determine the face normal for the fragment. The face normal obtained for the fragment can be the constant face normal associated with the mesh polygon on which the fragment is located. The face normal can be a vector having a direction pointing perpendicular to the polygon face. Any suitable technique can be used to obtain the face normal for the fragment. For instance, a graphics shader module can compute the face normal by computing the cross product of vectors defined based on the vertices of the mesh polygon. Because the face normal is constant over the surface of the mesh polygon, each fragment on the same mesh polygon can be associated with the same face normal.

Figure 7:
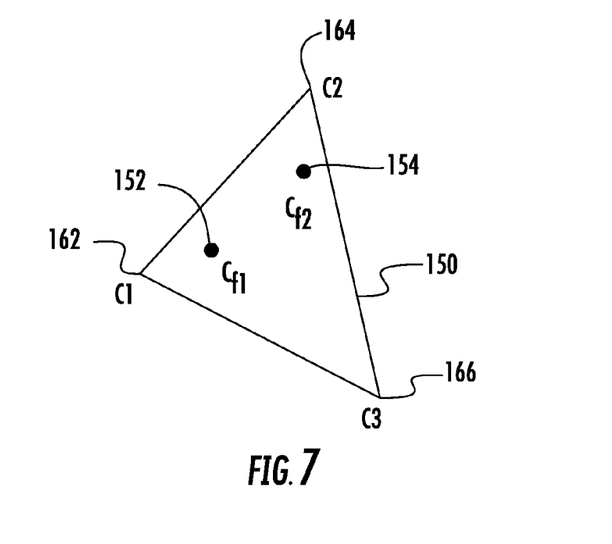
FIG. 7 depicts an exemplary mesh polygon and the interpolation of curvature factors according to an exemplary embodiment of the present disclosure.

For instance, FIG. 7 depicts an exemplary three-dimensional mesh polygon 150. Fragments 152 and 154 are located on the mesh polygon. Two fragments 152 and 154 are depicted in FIG. 7 for sake of clarity of illustration. One of ordinary skill in the art, using the disclosures provided herein, will understand that many fragments can be located on the mesh polygon 150 depending on resolution. A face normal is associated with each fragment 152 and 154. The face normal for the fragments 152 and 154 can be equal to the face normal determined for the mesh polygon 150. The fragments 152 and 154 are each associated with the same face normal as the face normal is constant across the surface of the mesh polygon 150.

Referring back to FIG. 6 at (404), an interpolated vertex normal is obtained for the fragment. For instance, a graphics shader module can determine the interpolated vertex normal for the fragment. The interpolated vertex normal can be a vector determined by interpolating the vertex normals of the mesh polygon on which the fragment is located. The vertex normal can be determined using any suitable technique, such as Phong interpolation techniques. Phong interpolation techniques can linearly interpolate the vertex normals associated with the vertices of the mesh polygon based at least in part on the location of the fragment relative to the vertices.

For example, an interpolated vertex normal can be associated with each of fragment 152 and fragment 154 in the mesh polygon 150 of FIG. 7. The interpolated vertex normal for fragment 152 can be a linear interpolation of the vertex normals associated with the vertices 162, 164, and 166. The interpolated vertex normal for fragment 154 can also be a linear interpolation of the vertex normals associated with the vertices 162, 164, and 166. The interpolated vertex normal can be determined based on the relationship of the fragment with respect to the vertices. For instance, the interpolated vertex normal for fragment 152 can be more heavily weighted towards the vertex normal of vertex 162 because fragment 152 is located closer to vertex 162 relative to vertices 164 and 166. Similarly, the interpolated vertex normal for fragment 154 can be more heavily weighted towards the vertex normal of vertex 164 because fragment 154 is located closer to vertex 164 relative to vertices 162 and 166.

Referring back to FIG. 6 at (406), an interpolated curvature factor can be determined for the fragment. For instance, a graphics shader module can determine the interpolated curvature factor for the fragment. Similar to the interpolated vertex normal, the interpolated curvature factor can be determined by interpolating the curvature factors associated with the vertices of the mesh polygon. The interpolated curvature factor can be an interpolation of the curvature factors determined based on the location of the fragment relative to the vertices.

For example, an interpolated curvature factor $C_{f1}$ can be obtained for the fragment 152 of the mesh polygon 150 of FIG. 7. An interpolated curvature factor $C_{f2}$ can be obtained for the fragment 154 of the mesh polygon 150 of FIG. 7. The interpolated vertex normal $C_{f1}$ for fragment 152 can be an interpolation of the curvature factors $C_1$, $C_2$, and $C_3$ associated with the vertices 162, 164, and 166. The interpolated vertex normal $C_{f2}$ for fragment 154 can also be an interpolation of the curvature factors $C_1$, $C_2$, and $C_3$ associated with the vertices 162, 164, and 166.

The curvature factor for each fragment can be determined based on the relationship of the fragment with respect to the vertices. For instance, the interpolated curvature factor $C_{f1}$ for fragment 152 can be more heavily weighted towards the curvature factor $C_1$ of vertex 162 because fragment 152 is located closer to vertex 162 relative to vertices 164 and 166. Similarly, the interpolated curvature factor $C_{f2}$ for fragment 154 can be more heavily weighted towards the curvature factor $C_2$ of vertex 164 because fragment 154 is located closer to vertex 164 relative to vertices 162 and 166.

Referring back to FIG. 6 at (408), a curvature-driven normal is computed for the fragment. For instance, the curvature-driven normal is computed based on the face normal for the fragment, the interpolated vertex normal for the fragment, and the interpolated curvature factor for the fragment. In a particular implementation, the curvature-driven normal is computed based on the following algorithm:

$$Curvature\_Driven\_Normal = (1.0 - Curvature\_Factor) * Vertex\_Normal + Curvature\_Factor * Face\_Normal$$

where Curvature_Driven_Normal is the curvature-driven normal for the fragment, Curvature_Factor is the interpolated curvature factor for the fragment, Vertex_Normal is the interpolated vertex normal for the fragment, and Face_Normal is the face normal for the fragment.

Using this exemplary technique results in sharp features in the polygon mesh having curvature-driven normals that tend more toward face normal. In particular, the curvature-driven normal is determined primarily based on the face normal associated with the fragment for high curvature factors. As a result, sharp features can get better lighting or color after shading. Smooth features in the polygon mesh will have curvature-driven normals that tend more towards vertex normal. In particular, the curvature-driven normal is determined primarily based on the interpolated vertex normal associated with the fragment for low curvature factors. As a result, smooth features will look less faceted after shading.

Exemplary Computing Environment for Rendering a Three-Dimensional Model

Figure 8:
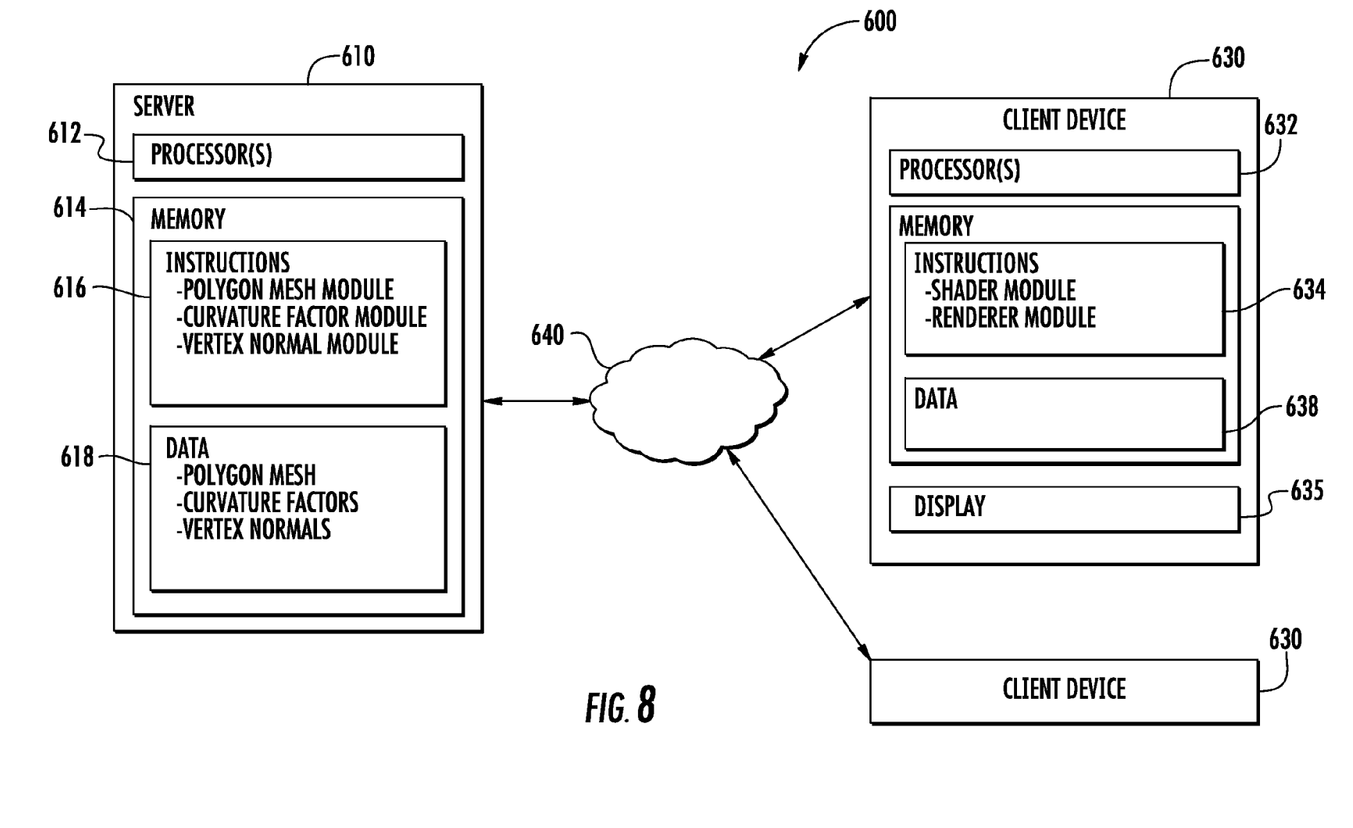
FIG. 8 depicts an exemplary computing environment for rendering a three-dimensional model according to an exemplary embodiment of the present disclosure.

FIG. 8 depicts an exemplary computing system 600 that can be used to implement the methods and systems for generating and rendering a three-dimensional model according to exemplary aspects of the present disclosure. The system 600 is implemented using a client-server architecture that includes a server 610 that communicates with one or more client devices 630 over a network 640. The system 600 can be implemented using other suitable architectures, such as a single computing device.

The system 600 includes a server 610, such as a web server used to host a geographic information system. The server 610 can be implemented using any suitable computing device(s). The server 610 can have a processor(s) 612 and a memory 614. The server 610 can also include a network interface used to communicate with one or more client devices 630 over a network 640. The network interface can include any suitable components for interfacing with one more networks, including for example, transmitters, receivers, ports, controllers, antennas, or other suitable components.

The processor(s) 612 can be any suitable processing device, such as a microprocessor, microcontroller, integrated circuit, or other suitable processing device. The memory 614 can include any suitable computer-readable medium or media, including, but not limited to, non-transitory computer-readable media, RAM, ROM, hard drives, flash drives, or other memory devices. The memory 614 can store information accessible by processor(s) 612, including instructions 616 that can be executed by processor(s) 612. The instructions 616 can be any set of instructions that when executed by the processor(s) 612, cause the processor(s) 612 to provide desired functionality. For instance, the instructions 616 can be executed by the processor(s) 612 to implement a polygon mesh module, a curvature factor module, and a vertex normal module.

The polygon mesh module can be configured to generate a polygon mesh, for instance, from imagery of a geographic area. For instance, the polygon mesh module can be configured to generate the polygon mesh using stereo matching techniques. The curvature factor can be configured to encode each vertex in the polygon mesh with a curvature factor as discussed in detail above. The curvature factors can be encoded in-line with other information, such a vertex normals and texture coordinates associated with the polygon mesh. Alternatively, the curvature factors can be encoded as a new flat array. The curvature factors can be compressed to reduce their size. The vertex normal module can be configured to compute vertex normals for each vertex in the polygon mesh.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or optical or magnetic media.

Memory 614 can also include data 618 that can be retrieved, manipulated, created, or stored by processor(s) 612. The data 618 can include geographic data to be served as part of the geographic information system, such as polygon meshes, textures, curvature factors, vertex normals, vector data, and other geographic data. The geographic data can be stored in a hierarchical tree data structure, such as quadtree or octree data structure, that spatially partitions the geographic data according to geospatial coordinates. The data 618 can be stored in one or more databases. The one or more databases can be connected to the server 610 by a high bandwidth LAN or WAN, or can also be connected to server 610 through network 640. The one or more databases can be split up so that they are located in multiple locales.

The server 610 can exchange data with one or more client devices 630 over the network 640. Although two client devices 630 are illustrated in FIG. 8, any number of client devices 630 can be connected to the server 610 over the network 640. The client devices 630 can be any suitable type of computing device, such as a general purpose computer, special purpose computer, laptop, desktop, mobile device, smartphone, tablet, wearable computing device, or other suitable computing device.

Similar the computing device 610, a client device 630 can include a processor(s) 632 and a memory 634. The processor(s) 632 can include one or more central processing units, graphics processing units dedicated to efficiently rendering images, and or other processing devices. The memory 634 can store information accessible by processor(s) 632, including instructions 636 that can be executed by processor(s) 632. For instance, the memory 634 can store instructions 636 for implementing a shader module and a renderer module. The shader module can be configured to compute curvature-driven normals for the polygon mesh and to perform shading operations on the three-dimensional model using the curvature-driven normals. The renderer module can be configured to render a graphical representation of the three-dimensional model on a display 635 associated with the computing device. The shader module and/or the renderer module can be implemented using an OpenGL shading language or other suitable computer graphics programming language or technique.

The memory 634 can also store data 638, such as polygon meshes, textures, curvature factors, vertex normals, face normals, curvature-driven normals, vectors, and other geographic data. The geographic data can be stored in a hierarchical tree data structure that spatially partitions the geographic data according to geospatial coordinates associated with the data.

The client device 630 can include various input/output devices for providing and receiving information from a user, such as a touch screen, touch pad, data entry keys, speakers, and/or a microphone suitable for voice recognition. For instance, the computing device 630 can have a display 635 for rendering the graphical representation of the three-dimensional model.

The client device 630 can also include a network interface used to communicate with one or more remote computing devices (e.g. server 610) over the network 640. The network interface can include any suitable components for interfacing with one more networks, including for example, transmitters, receivers, ports, controllers, antennas, or other suitable components.

The network 640 can be any type of communications network, such as a local area network (e.g. intranet), wide area network (e.g. Internet), or some combination thereof. The network 640 can also include a direct connection between a client device 630 and the server 610. In general, communication between the server 610 and a client device 630 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

Exemplary Server-Client Flow Diagram

Figure 9:
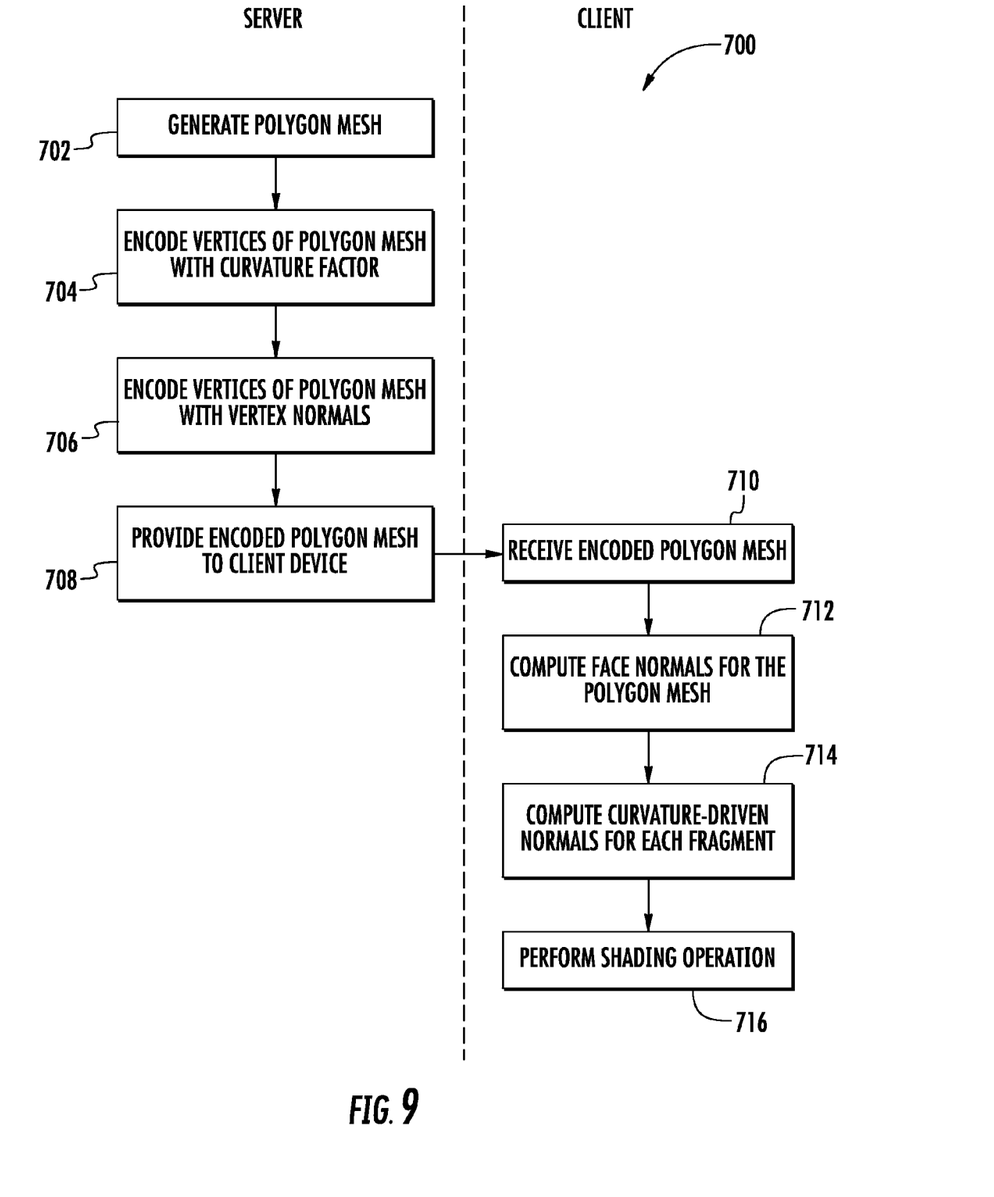
FIG. 9 depicts an exemplary server-client flow diagram according to an exemplary embodiment of the present disclosure.

FIG. 9 depicts an exemplary server-client flow diagram of an exemplary method (700) for rendering a three-dimensional model according to an exemplary embodiment of the present disclosure. The method (700) of FIG. 9 will be discussed with reference to the server-client architecture of the system 600 depicted in FIG. 8. The method (700), however, can be implemented using other computing systems.

At (702), a polygon mesh is generated at the server 610. The polygon mesh can be generated, for instance, by a polygon mesh module that performs stereo matching techniques to generate the polygon mesh from two-dimensional imagery, such as imagery of a geographic area. The polygon mesh can include a plurality of mesh polygons interconnected by vertices and edges.

At (704), the server 610 can encode the vertices of the polygon mesh with a curvature factor. For instance, the server 610 can implement a curvature factor module to determine the curvature factor for each vertex in the polygon mesh. The curvature factor can then be encoded in the binary representation of the polygon mesh either in line with other data associated with polygon mesh or as a new array. At (706), the server 610 can also encode the vertices of the polygon mesh with the vertex normals. The vertex normals can be face weighted vertex normals determined by, for instance, a vertex normal module implemented by the server 610.

At (708), the server 610 can provide the encoded polygon mesh to a client device 630. The server 610 can provide the data to the client device 630 in response to a request for information from the client device 630. In a particular implementation, the client device 630 can determine whether to fetch curvature factor data for the polygon mesh. For instance, the client device 630 can determine whether the curvature-driven normal is needed (e.g. the user desires to perform a shading operation such as application of sunlight to a three-dimensional model of the geographic area). The client device 630 can also determine whether there is enough memory/processing capability to perform the shading operation using curvature-driven normals. If so, the client device 630 can fetch the polygon mesh encoded with curvature factors from the server 610. Otherwise, the client device 630 can fetch the polygon mesh and other data without curvature factors.

At (710), the encoded polygon mesh is received at the client device 630. The client device can then send the encoded polygon mesh, including curvature factors and vertex normals, to a graphics processing unit (e.g. a video card). At (712), the client device can compute face normals for the polygon mesh. For instance, a shader module can be implemented to compute face normals for the mesh using derivative functions (e.g. cross product of certain vectors in OpenGL shading language).

At (714), the curvature-driven normal is computed for each fragment in the polygon mesh. In particular, the graphics shader module can use the face normals, interpolated vertex normals, and interpolated curvature factors can be used to determine the curvature-driven normal for each fragment as discussed in detail with reference to FIG. 6. At (716) of FIG. 9, a shading operation, such as lighting operation, is performed using the curvature-driven normals. The shading operation can be performed by the graphics shader module implemented by the client device 630.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of rendering a three-dimensional model, the method comprising:
   accessing, by one or more computing devices, a polygon mesh representing geometry of the three-dimensional model, the polygon mesh comprising a mesh polygon and a vertex;
   obtaining, by the one or more computing devices, a curvature factor for the vertex of the polygon mesh, the curvature factor for the vertex indicative of a local curvature of the polygon mesh at the vertex;
   obtaining, by the one or more computing devices, a curvature-driven normal for a fragment of the polygon mesh located on the mesh polygon, the curvature-driven normal determined based at least in part on a face normal associated with the fragment scaled in direct proportion to the curvature factor, and an interpolated vertex normal associated with the fragment scaled in inverse proportion to the curvature factor; and
   performing, by the one or more computing devices, a shading operation using the curvature-driven normal;
   wherein the obtained curvature-driven normal used by the shading operation causes the shading operation to tend toward vertex normal when the curvature factor is below a threshold, and the obtained curvature-driven normal used by the shading operation causes the shading operation to tend toward face normal when the curvature factor is above the threshold.

2. The computer-implemented method of claim 1, wherein a plurality of mesh polygons are connected in the polygon mesh at the vertex, each of the plurality of mesh polygons associated with a face normal, the curvature factor for the vertex being determined based on the relationship between the face normals of the plurality of mesh polygons connected at the vertex.

3. The computer-implemented method of claim 2, wherein the curvature factor is determined based at least in part on the dot product of the face normals of the plurality of mesh polygons connected at the vertex.

4. The computer-implemented method of claim 1, wherein the curvature factor for the vertex has a value ranging from 0 to 1, wherein a curvature factor of 0 is indicative of a planer set of mesh polygons connected at the vertex and a curvature factor of 1 is indicative a perpendicular or sharper set of mesh polygons connected at the vertex.

5. The computer-implemented method of claim 1, wherein the face normal is constant over a surface of the mesh polygon.

6. The computer-implemented method of claim 1, wherein the interpolated vertex normal for the fragment is determined by interpolating a vertex normal associated with the vertex.

7. The computer-implemented method of claim 1, wherein obtaining, by the one or more computing devices, a curvature-driven normal for a fragment of the mesh polygon comprises determining an interpolated curvature factor for the fragment, the interpolated curvature factor for the fragment determined by interpolating the curvature factor associated with the vertex.

8. The computer-implemented method of claim 7, wherein the curvature-driven normal for the fragment is determined according to the following:

$$Curvature\_Driven\_Normal=(1.0-Curvature\_Factor)*Vertex\_Normal+Curvature\_Factor*Face\_Normal$$

where Curvature_Driven_Normal is the curvature-driven normal for the fragment, Curvature_Factor is the interpolated curvature factor for the fragment, Vertex_Normal is the interpolated vertex normal for the fragment, and Face_Normal is the face normal for the fragment.

9. The computer-implemented method of claim 1, wherein the shading operation comprises a lighting operation.

10. The computer-implemented method of claim 1, wherein the method comprises rendering, by the one or more computing devices, a graphical representation of the three-dimensional model on a display associated with the computing device.

11. The computer-implemented method of claim 10, wherein the fragment corresponds to a pixel in the graphical representation of the three-dimensional model.

12. The computer-implemented method of claim 1, wherein the three-dimensional model is of a geographic area, the polygon mesh modeling geometry of terrain and buildings in the geographic area.

13. The computer-implemented method of claim 1, wherein obtaining the curvature factor for the vertex of the polygon mesh comprises receiving the curvature factor for the vertex from a remote computing device over a network.

14. The computer-implemented method of claim 13, wherein obtaining, with the computing device, a curvature-driven normal for a fragment of the polygon mesh located on the mesh polygon comprises computing the curvature-driven normal for the fragment at the computing device.

15. A computing system for rendering a three-dimensional model, the computing system comprising:
one or more processors;
one or more computer-readable media, the one or more computer-readable media storing computer-readable instructions that when executed by the one or more processors cause the one or more processors to perform operations, the operations comprising:
accessing a polygon mesh representing geometry of the three-dimensional model, the polygon mesh comprising a mesh polygon and a vertex;
obtaining a curvature factor for the vertex of the polygon mesh, the curvature factor for the vertex indicative of a local curvature of the polygon mesh at the vertex;
obtaining a curvature-driven normal for a fragment of the polygon mesh located on the mesh polygon, the curvature-driven normal determined based at least in part on a face normal associated with the fragment scaled in direct proportion to the curvature factor, and an interpolated vertex normal associated with the fragment scaled in inverse proportion to the curvature factor; and
performing a shading operation using the curvature-driven normal;
wherein the obtained curvature-driven normal used by the shading operation causes the shading operation to tend toward vertex normal when the curvature factor is below a threshold, and the obtained curvature-driven normal used by the shading operation causes the shading operation to tend toward face normal when the curvature factor is above the threshold.

16. The computing system of claim 15, wherein the curvature-driven normal for the fragment is determined according to the following:

$$Curvature\_Driven\_Normal=(1.0-Curvature\_Factor)*Vertex\_Normal+Curvature\_Factor*Face\_Normal$$

where Curvature_Driven_Normal is the curvature-driven normal for the fragment, Curvature_Factor is an interpolated curvature factor associated with the fragment, Vertex_Normal is the interpolated vertex normal for the fragment, and Face_Normal is the face normal associated with the fragment.

* * * * *